(12) United States Patent
Gravouia

(10) Patent No.: US 6,446,524 B1
(45) Date of Patent: Sep. 10, 2002

(54) RING GEAR SUPPORTING IDLER GEAR

(76) Inventor: Mark F. Gravouia, 306 W. Second St., Lafayette, LA (US) 70501

( * ) Notice: Subject to any disclaimer, the term of this patent is extended or adjusted under 35 U.S.C. 154(b) by 0 days.

(21) Appl. No.: 09/558,986

(22) Filed: Apr. 27, 2000

(51) Int. Cl.⁷ .............................................. B25B 17/00
(52) U.S. Cl. ..................................... 74/459.5; 81/57.33
(58) Field of Search ............................. 81/57.33, 57.15; 74/459.5, 318, 433, 440, 444, 445, 446; 384/550; 475/335

(56) References Cited

U.S. PATENT DOCUMENTS

| | | | | |
|---|---|---|---|---|
| 1,513,181 A | * | 10/1924 | Powell | 475/335 |
| 1,604,604 A | * | 10/1926 | Powell | 475/335 |
| 3,330,171 A | * | 7/1967 | Nasvytis | 475/335 X |
| 4,084,453 A | * | 4/1978 | Eckel | 81/57.33 X |
| 4,674,360 A | * | 6/1987 | Matoba | 475/335 |
| 4,901,602 A | * | 2/1990 | Matoba | 475/335 |
| 5,291,808 A | * | 3/1994 | Buck | 81/57.15 X |

\* cited by examiner

*Primary Examiner*—David A. Bucci
*Assistant Examiner*—Colby Hansen
(74) *Attorney, Agent, or Firm*—Jones, Walker, Waechter, Poitevent, Carrere & Denegre, L.L.P.

(57) ABSTRACT

A power tong gear train which includes a ring gear having a series of teeth and a roller surface. The gear train further includes an idler gear assembly having a series of teeth and a roller element fixed thereto. The idler gear assembly is positioned such that the roller element engages the roller surface and maintains the tangential orientation of the two gears' respective pitch diameters.

14 Claims, 7 Drawing Sheets

1

RING GEAR SUPPORTING IDLER GEAR

BACKGROUND OF INVENTION

The present invention relates to power tongs typically used in the oil and gas industry to make up and break apart threaded joints on pipe, casing and similar tubular members. In particular, this invention relates to an improved gear train used within the power tong to prevent undesirable spreading of the power tong's ring gear.

Power tongs have been in existence for many years and are generally employed in the oil and gas industry to grip and rotate tubular members, such as drill pipe. It is necessary to grip drill pipe with high compressive forces while applying a high degree of torque in order to break apart or tighten threaded pipe connections. In most cases, power tong designs employ a cam mechanism for converting a portion of the torque into a gripping (compressive) force normal to the pipe. This conversion is often accomplished utilizing a power-driven ring gear having an interior cam surface. A cam follower (roller) on a jaw member rides upon the cam surface. As the ring gear is rotated, the follower (and thus the jaw member) is urged into contact with the pipe.

Most current power tong designs include a tong body and ring gear with an open slot or throat, through which the drill pipe is passed in order to place the power tong in position around the pipe. Due to the tremendous forces generated during use, open throat ring gears must resist the tendency to spread during use. Prior art open throat tongs typically employ heavy-duty rollers and other support structure to resist spreading. The prior designs also increase the cross-sectional thickness of the ring gear to help resist spreading. Of course, increasing the cross-section undesirably increases the overall cost and weight of the tong. Despite such attempts to limit spreading, prior art tongs often excessively spread and fail during use, resulting in tremendous costs and down time during expensive drilling operations. Even when there is not out-right operational failure, disproportionate spreading will cause excessive gear tooth wear or other damage which unacceptably reduces the life of the tong.

What is needed in the art is a power tong gear train which will support the throat of a ring gear and limits spreading to an acceptable degree as the throat passes the idler gears. It is desired that any spreading be limited to less than the manufacturing tolerances for which the gears within the tongs are designed.

OBJECTS AND SUMMARY OF THE INVENTION

It is therefore an object of this invention to provide a power tong gear train which prevents spreading of the ring gear to a greater degree than hereto known in the art.

It is another object of this invention to provide an idler gear which incorporates a roller element which supports a bearing surface on the ring gear.

Therefore one embodiment of the present invention provides an improved power tong gear train which includes a ring gear having a series of teeth and a bearing surface. The gear train further includes an idler gear having a series of teeth and a roller element fixed thereto. The idler gear is positioned such that the roller element engages the ring gear's bearing surface and maintains the tangential orientation of the two gears' respective pitch diameters.

Another embodiment of the present invention provides an improved idler gear for a power tong gear train. The improved idler gear includes a gear having a pitch diameter and a roller element fixed to the gear. The roller element has a diameter greater than the pitch diameter of the gear.

BRIEF DESCRIPTION OF THE DRAWINGS

FIG. 1 includes an insert showing the meshing of the gear teeth of the ring gear and idler gear.

DETAILED DESCRIPTION

Figure 1:
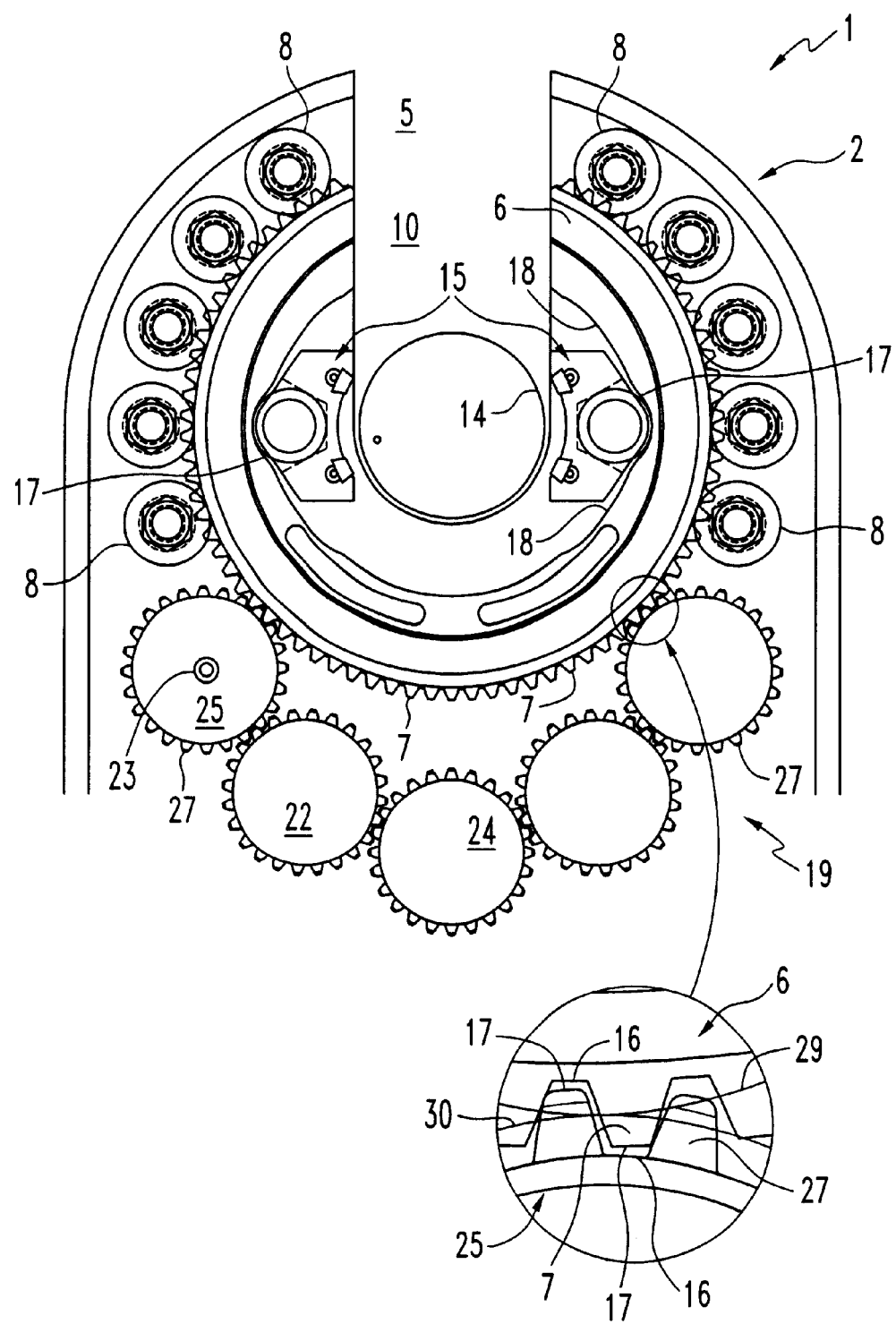
FIG. 1 is top planar view of a prior art power tong gear train and supporting structure.

For purposes of describing the prior art ring gear and related gear train, reference may be made to the power tong seen in FIG. 1. A fuller description of the power tong gear train may found in references such as U.S. application Ser. No. 09/483,895 filed on Jan. 18, 2000 by inventor David A. Buck and U.S. Pat. No. 4,404,876, both of which are incorporated by reference herein. Power tong 1 has a body 2 which usually includes a top plate, but in the Figures of this application the top plate has been removed in order to show the power tong's gear train. Additional components of the power tong not needed to disclose the present invention have been excluded for the sake of clarity. The gear train 19 includes ring gear 6 which is rotatively mounted within body 2 on roller bearings 8. Ring gear 6 includes a set of neutral cam surfaces 17 (better seen in FIG. 2) and positive cam surfaces 18 formed on the inner perimeter of ring gear 6. While not shown, it is well known in the art how cage plates are positioned within ring gear 6 and act as jaw carriers for jaw members 15. Power tong body 2 has an open throat 5 and ring gear 6 has a corresponding open throat 10.

Figure 2:
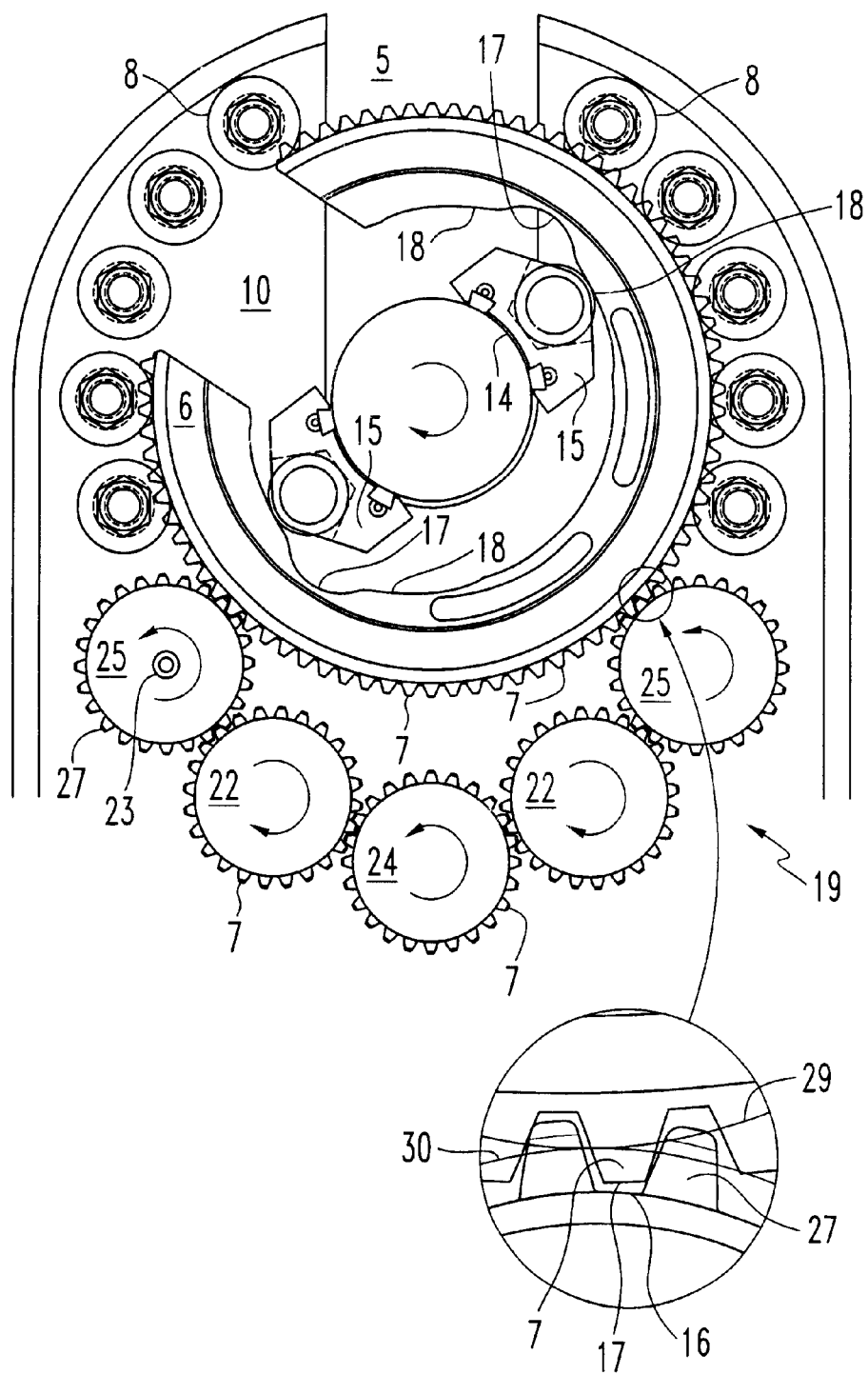
FIG. 2 is a similar view as FIG. 1, except the jaws of the power tong are now engaged.

FIG. 1 illustrates how throat 5 and throat 10 may be aligned in a "neutral" or "open throat" position to allow the insertion of a tubular member 14 (seen in FIG. 2) into tong body 2. Power tong 1 grips tubular 14 by way of relative movement between jaw members 15 (held by the cage plates) and ring gear 6. FIG. 2 illustrates when ring gear 6 is rotated out of the neutral position as shown in FIG. 1, the jaw members 15 move onto positive cam surfaces 18 and grip tubular 14. Once tubular 14 is griped, ring gear 6 will continue rotating in order to connect or disconnect a threaded joint formed between two tubulars. The foregoing is well known in the art and disclosed in references such as U.S. Pat. No. 5,291,808 to Buck and U.S. Pat. No. 4,084,453 to Eckel, both of which are incorporated by reference herein.

The rotation of ring gear 6 is caused by the power tong gear train 19 which is seen in FIGS. 1–3. Ring gear 6 will have a series of teeth 7 around its perimeter except for the opening of throat 10. Gear train 19 comprises the ring gear 6 and the set of gears transferring power from motor gear 24 to ring gear 6. While not explicitly shown, it will be understood that a motor is connected to motor gear 24 and imparts torque thereto. All gears in gear train 19 have teeth 7 and are mounted on a gear shaft 23 upon which the gears may freely rotate, all of which is well known in the art. In the illustrated gear train 19, a set of idler gears 25 engage and transfer torque to ring gear 6. Another gear 22 transfers torque to idler gears 25 and gear 22 in turn has torque transferred to it by motor gear 24 such that torque may be transferred from the motor, through gear train 19, to ring gear 6. It will be readily apparent that one purpose of gear train 19 is to convert the relatively high speed, low torque rotation of the motor to lower speed, higher torque rotation at ring gear 6. Thus, the gear train will have at least one and typically several stages of speed reduction and torque elevation.

Although the figures illustrate a gear train comprising five gears, this is only illustrative and the present invention could reside in a gear train having any number of gears. For example, an alternative gear train 19 could have four idler gears 25 rather than the two shown. All such variations in gear train 19 could be utilized in conjunction with the present invention.

Figure 4:
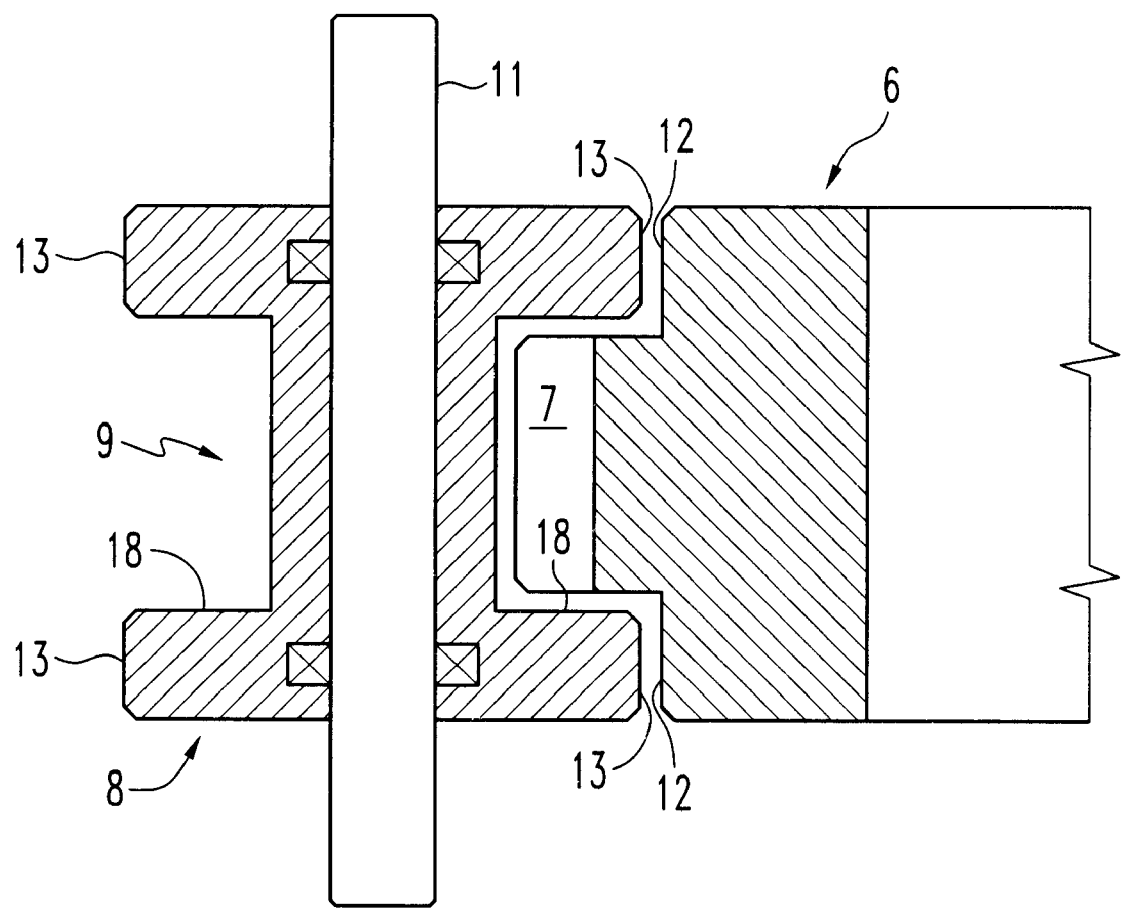
FIG. 4 is a side cross-sectional view of the prior art dumbbell roller bearing.

As mentioned above, ring gear 6 is supported on a series of roller bearings 8. An enlarged cross-sectional view of ring gear 6 engaging a roller bearing 8 is shown in FIG. 4. It can be seen how roller bearing 8 includes upper and lower bearing surfaces 13 with a tooth slot 9 formed between bearing surfaces 13. Slot 9 in turn forms a tooth supporting lip 18. It will be understood that roller bearing 8 is annular in shape and thus resembles a "dumbbell" training weight. As is well known in the art, roller bearing 8 will freely rotate on shaft 11, the ends of which are fixed to the upper and lower body portions of power tong 1. Ring gear 6 is supported by roller bearings 8 by way of ring gear teeth 7 riding within tooth slot 9 and lip 18 acting as a vertical support for teeth 7, and thus supporting ring gear 6 in the vertical direction. Roller bearing 8 will also have bearing surfaces 13 which are configured to engage roller surfaces 12 and support ring gear 6 in the horizontal direction. While FIG. 4 illustrates a distinct gap between bearing surface 13 and roller surface 12 (also between tooth 7 and lip 18), this is merely to show a clear distinction between the various parts seen in FIG. 4. In reality, bearing surface 13 and roller surface 12 will be in contact or positioned so closely together that any movement of roller surface 12 toward bearing surface 13 will bring these parts into contact. As explained above, tooth 7 will be in contact with (i.e. rest upon) lip 18.

Figure 3A:
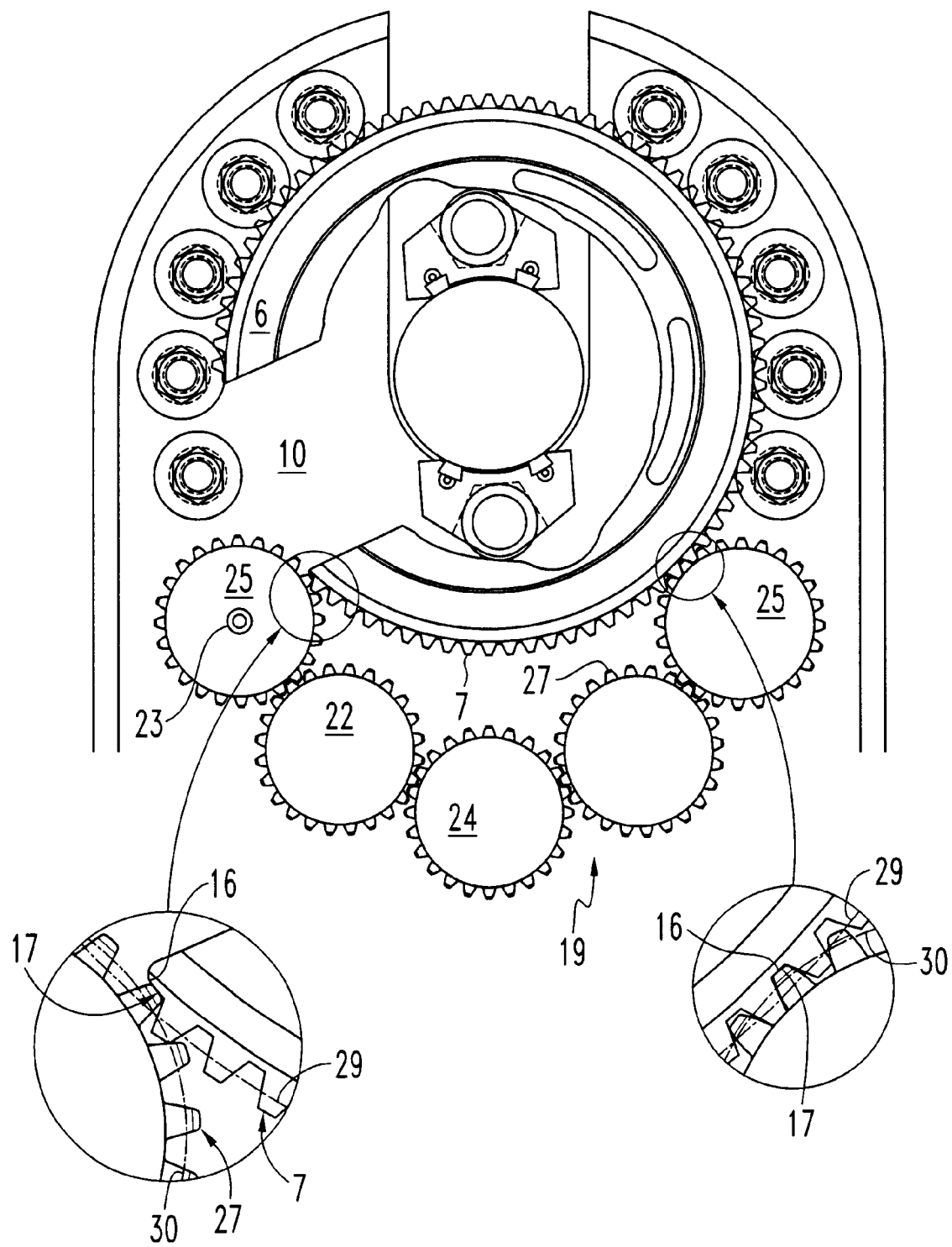
FIG. 3a illustrates the gear train without the tong body or support structure and includes inserts showing the undesirable engagement of the gear teeth of the ring gear and the idler gear.
Figure 3B:
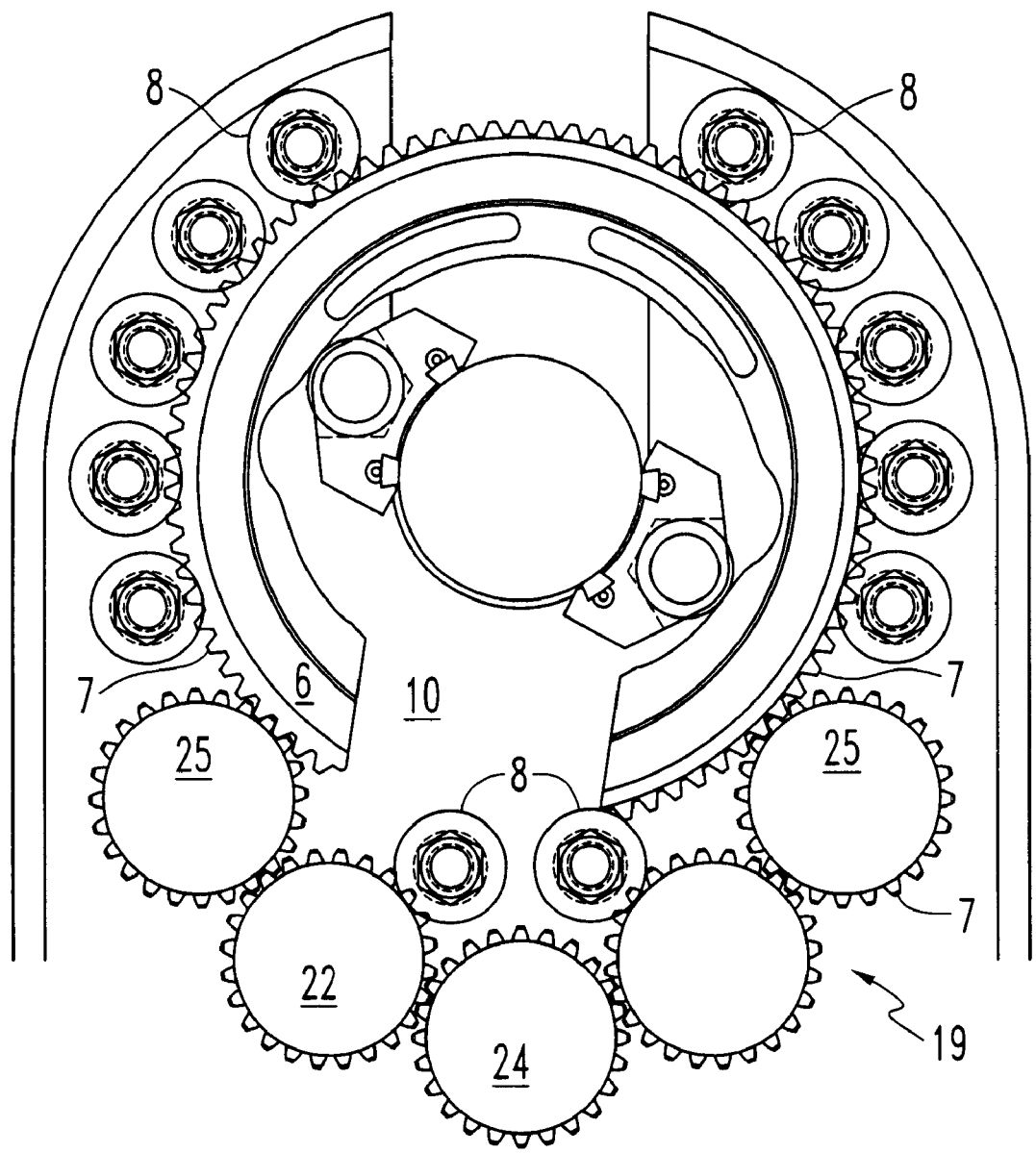
FIG. 3b illustrates an alternative prior art design which positions a roller bearing between the idler gears.

Viewing FIGS. 1 and 2, it can be seen how roller bearings 8 tend to resist the spreading of ring gear throat 10. When throat 10 is in the position shown in FIG. 1 or 2, any tendency of throat 10 to spread is countered by roller surface 12 being in contact with bearing surface 13 (as seen in FIG. 4). However, in many tongs it is not practical to position roller bearings 8 amongst the idler gears 25, because of the small size of the tongs or because of the particular arrangement of the gears in the gear train. Thus, there may not be sufficient space between idlers 25 to accommodate a roller bearing and when ring gear throat 10 approaches idler gears 25 as illustrated in FIG. 3a, throat 10 will not be supported (on both sides) by roller bearings 8. In lager tongs or tongs with a more simplified gear train arrangement, there may be enough space between idlers 25 in order to position a roller bearing 8 therein as suggested in FIG. 3b. However, even this design can leave throat 10 unsupported as throat 10 passes by the roller bearing 8 as shown in FIG. 3b. While this problem is not as severe as in the smaller tongs, the momentary lack of support does cause some of the adverse effects associated with spreading. Thus, when throat 10 approaches the vicinity of idler gears 25 as shown in FIG. 3a or 3b, there is either no longer a bearing surface supporting roller surface 12 (FIG. 3a) or the bearing surface is not continuous as throat 10 passes the bearing surface (FIG. 3b). In either case, the ring gear is not fully restrained from spreading during contact with the teeth of idler gears 25. As can be better understood with reference to the inserts found in FIGS. 1–3, this spreading causes improper engagement of the teeth on ring gear 6 with the teeth on idler gears 25.

The insert of FIG. 1 shows how the teeth of ring gear 6 and idler gear 25 should mesh prior to any load being transferred to ring gear 6 by idler gear 25. The ring gear teeth 7 and idler gear teeth 27 both have teeth tips 17 and teeth roots 16 formed between adjacent teeth. The insert of FIG. 1 also illustrates how each gear will have a "pitch diameter" represented by arcs 29 and 30 for ring gear 6 and idler gear 25 respectively. The concept of pitch diameter is well known in the art and is the diameter where the teeth effectively mesh. It can bee seen from the FIG. 1 insert that when ring gear 6 and idler gear 25 are not loaded, their respective pitch diameters are tangent to one another (i.e. the pitch diameters are touching but not crossing).

FIG. 2 illustrates how ring gear 6 has rotated and how jaw members 15 are moving onto positive cam surfaces 18. The insert of FIG. 2 reflects the engagement of ring gear teeth 7 by idler gear teeth 27. It can be seen that teeth 7 and 27 are engaging one another along their sides and that there is still clearance between the roots 16 and tips 17 of the teeth. This is proper engagement of teeth 7 and 27 which is reflected by the fact that pitch diameters 29 and 30 are still tangent to one another. This should remain the case as long as throat 10 is properly supported by roller bearings 8 and therefore cannot spread.

However, FIG. 3a illustrates the problem encountered when throat 10 approaches idler gears 25 and can no long be supported by roller bearings 8. There is now a tendency for throat 10 to spread, which causes gear teeth 7 and 27 to improperly engage as shown in the FIG. 3a insert. It can be seen that roots 16 and tips 17 of the teeth are actually in contact. This is reflected in the fact that pitch diameters 29 and 30 actually overlap one another. The effect of the teeth being "jammed" against one another is that much greater friction forces must be overcome and more power is needed to rotate the gears than if the pitch diameters were properly tangential. This results in extreme stress and excessive wear on the teeth. Also, the additional power needed to overcome the increased frictional forces is dissipated as heat energy into the affected gears. Use of the power tong gear train under these circumstances will likely cause serious damage to the power tong, essentially "burning up" the power tong's gear train.

Figure 5:
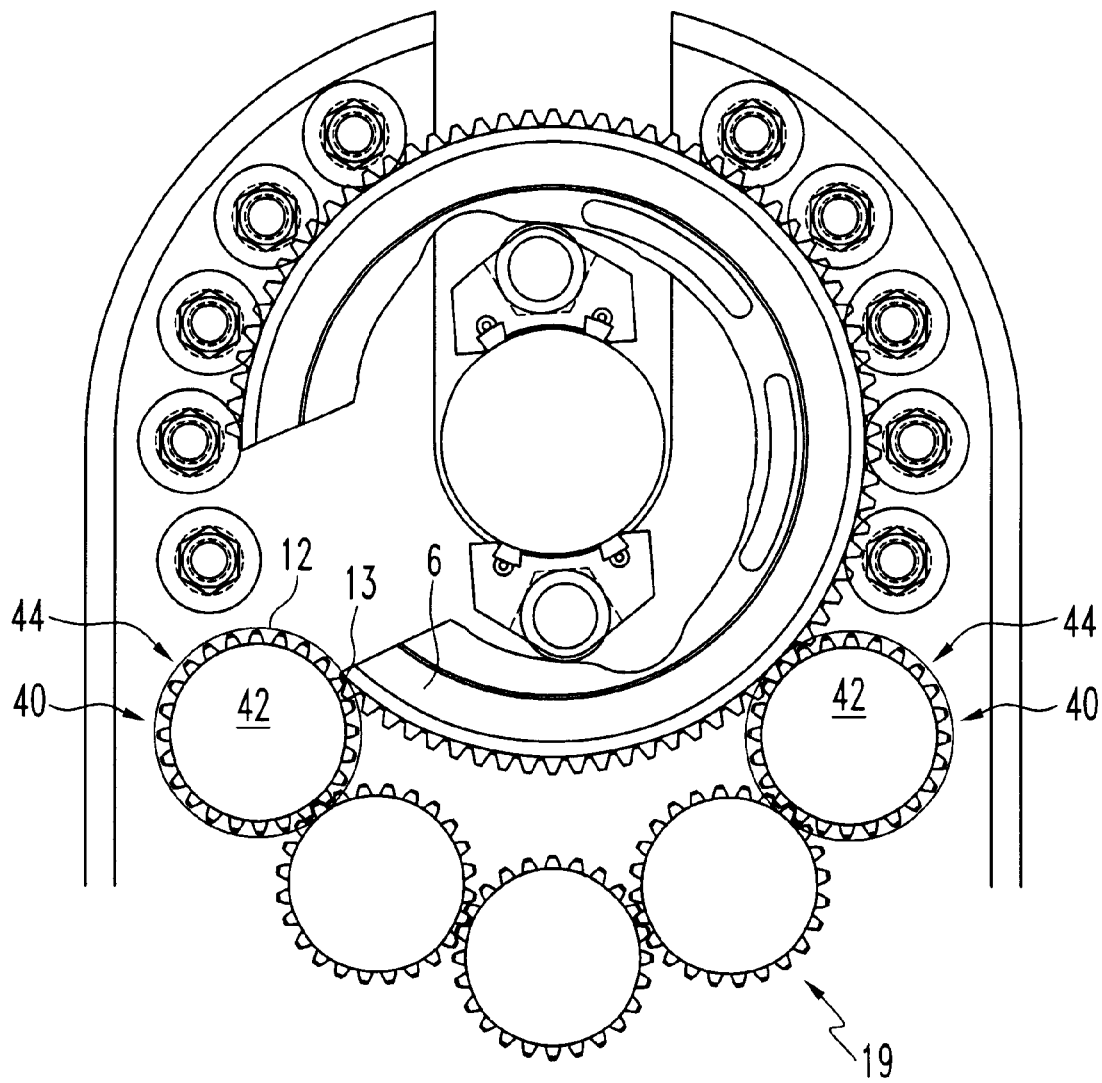
FIG. 5 is a top planar view of the improved power tong gear train of the present invention.
Figure 6:
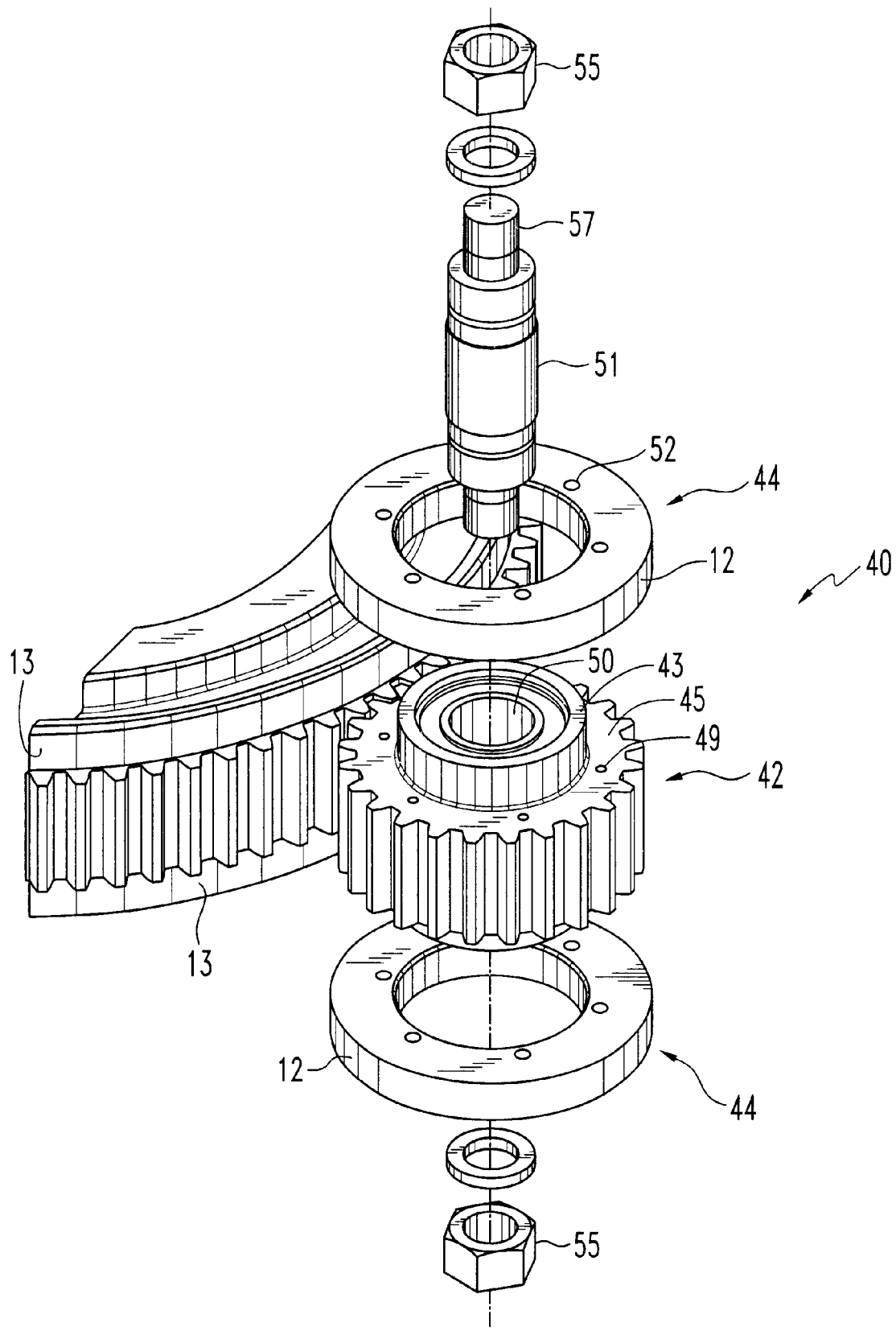
FIG. 6 is a perspective view of the ring gear supporting idler gear assembly of the present invention.

The improved power tong gear train of the present invention is illustrated in FIG. 5. The gear train 19 includes supporting idler gear assembly 40. While the embodiment of FIG. 5 illustrates two supporting idler gear assemblies 40, the scope of the invention is intended to include fewer or more supporting idler gear assemblies 40. Supporting idler gear assembly 40 is seen in greater detail in FIG. 6. Supporting idler gear assembly 40 will generally comprise idler gear 42, roller element 44, and gear shaft 51. The embodiment of idler gear 42 seen in FIG. 6 includes an upper surface 45 with a hub 43 formed thereon. While not distinctly seen in FIG. 6, it will be understood that idler gear 42 has an identical lower surface with a similar hub 43. Idler gear 42 will also have a center aperture 50 formed through its length and bolt apertures 49 formed on upper surface 45 and on the hidden lower surface. The inside diameter of roller element 44 is slightly larger than the outer diameter of hub 43. Thus, roller element 44 will fit over hub 43 and rest on upper surface 45. Conventional bolts or screws will pass through apertures 52 in roller element 44 and into apertures 49 in upper surface 45. These bolts or screws will fix roller element 44 in relation to idler gear 42 in order to prevent rotation between these elements. It will be apparent from FIG. 6 that a second roller element 44 is fastened to the bottom surface of idler gear 42 in the same manner. Gear shaft 51 will pass through center aperture 50 in idler gear 42 and maintain supporting idler gear assembly 40 in its proper location in gear train 19. While not shown in the figures, bearing surfaces will be positioned within aperture 50 to allow idler gear 42 to rotate freely on shaft 51 in any manner known in the art. Examples of suitable bearing surfaces could include conventional ball bearings, roller or needle bearings, or cylindrical bushing systems. Details of such bearing surfaces may be seen in U.S. Pat. No. 5,819,605 issued to David Buck and Daniel Bangert, the entirety of which is incorporated by reference herein. Threaded ends 57 of shaft 51 my be positioned through the top and bottom plates of tong body 2 and secured thereon by nuts 55. The particular manner in which idler gear 42 is rotatively mounted on shaft 51 or the manner in which shaft 51 is fixed to the tong body is not relevant to the function of the present invention. All conventional ways of accomplishing these tasks are considered to come within the scope of the present invention.

FIG. 5 best illustrates how the roller surface 12 of roller element 44 is always in contact with bearing surface 13 of ring gear 6 when the teeth of ring gear 6 and idler gear 42 are in contact. Roller element 44 will have an outside diameter 53 and idler gear 42 will have a major diameter 54 which is defined as the widest tip to tip distance between teeth on idler gear 42. When bearing surface 13 and roller surface 12 are in contact, the teeth of idler gear 42 and ring gear 6 are maintained in proper alignment as seen in the inserts of FIGS. 1 and 2. It will be readily apparent that roller element 44 prevents the pitch diameters from overlapping as seen in the FIG. 3a insert. Thus, supporting idler gear assembly 40 insures the teeth of both the ring gear and idler gear will not suffer undue stress, wear, and heat damage.

It is believed that those skilled in the art will recognize many other embodiments which fall within in the scope of the present invention. For example, it is not strictly necessary that the roller element 44 extend beyond the idler gear teeth to engage the bearing surface 13 of ring gear 6. Rather, it is possible for ring gear bearing surface 13 to extend outward over the ring gear teeth and idler gear teeth in order to engage a roller element which has a diameter less than the major diameter 54 seen in FIG. 5. Additionally, it is not strictly necessary for roller element 44 to be non-rotationally fixed to idler gear 25. Thus, roller element 44 could be rotatively positioned on hub 43 (or shaft 51 in the absence of hub 43) by way of any conventional rotative bearing surface (e.g. ball bearings, pin bearings, bushings, etc.). These two modifications are intended only as examples of the many variations the present invention may take. These embodiments and all other equivalent variations and modifications of the present invention are intended to come within the scope of the following claims.

I claim:

1. An improved gear train for a power tong, said gear train comprising:

a. a ring gear having, an open throat, a series of teeth and a roller surface; and b. an idler gear having a series of teeth and a roller element fixed thereto, wherein said idler gear is fixedly positioned in said gear train relative to said ring gear such that said roller element engages said roller surface.

2. The improved gear train according to claim 1; wherein said idler gear and said ring gear each have a pitch diameter and said roller element and said roller surface are sized to maintain said pitch diameters in tangential orientation when said roller element and roller surface are engaged.

3. The improved gear train according to claim 2, wherein said roller element extends beyond said pitch diameter of said idler gear to engage said roller surface.

4. The improved gear train according to claim 1, wherein said idler gear has an upper and lower roller element and said ring gear has corresponding upper and lower roller surfaces.

5. The improved gear train according to claim 4, wherein said roller elements are fixed to said idler gear by a series of threaded members passing through corresponding apertures in said idler gear and said roller elements.

6. The improved gear train according to claim 4, wherein said gear has hubs extending from top and bottom sides and said roller elements are ring shaped members engaging said hubs.

7. The improved gear train according to claim 6, wherein said idler gear a center aperture and a gear shaft extending therethrough.

8. The improved gear train according to claim 6, further comprising a second idler gear with a roller element.

9. The improved gear train according to claim 4, wherein said idler gear has a center aperture and a gear shaft extending therethrough.

10. The improved gear train according to claim 4, further comprising a second idler gear with a roller element.

11. The improved gear train according to claim 1, wherein said roller element is fixed to said idler gear by a series of threaded members passing through corresponding apertures in said idler gear and said roller element.

12. The improved gear train according to claim 1, wherein said idler gear has a center aperture and a gear shaft extending therethrough.

13. The improved gear train according to claim 1, further comprising a second idler gear with a roller element.

14. A power tong having an improved gear train, said power tong including:

a. a tong body;

b. a ring gear positioned within said tong body and having, an open throat and a roller surface;

c. a series of rollers rotatively supporting said ring gear in said tong body;

d. an idler gear assembly engaging said ring gear, said idler gear assembly including a roller element fixed thereto, wherein said idler gear assembly is fixedly positioned relative to said ring gear such that said roller element engages said roller surface of said ring gear;

e. a series of drive gears transferring torque to said idler gear; and f. a motor transferring torque to said drive gears.

* * * * *